Feb. 21, 1933.         G. R. BLAUVELT         1,898,285
MACHINE TOOL
Filed Jan. 18, 1928         2 Sheets-Sheet 1

INVENTOR.
GEORGE R. BLAUVELT
BY A. B. Bowman
ATTORNEY

Feb. 21, 1933. G. R. BLAUVELT 1,898,285
MACHINE TOOL
Filed Jan. 18, 1928 2 Sheets-Sheet 2
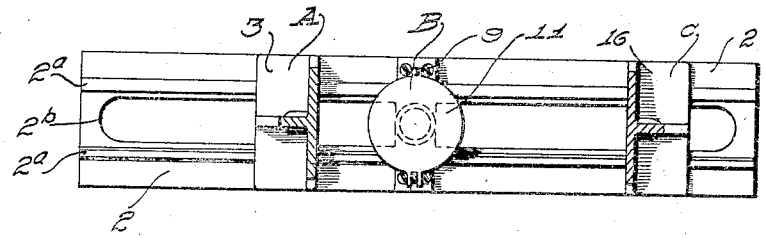
FIG. 6
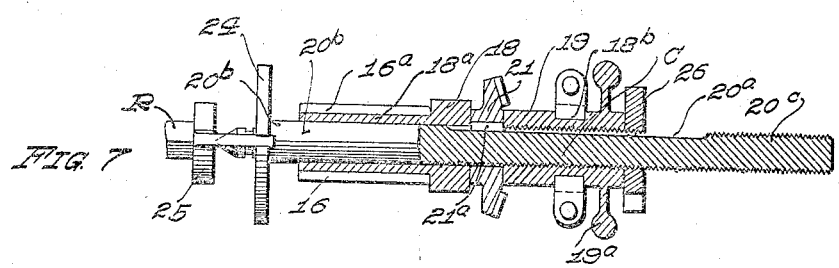
FIG. 7
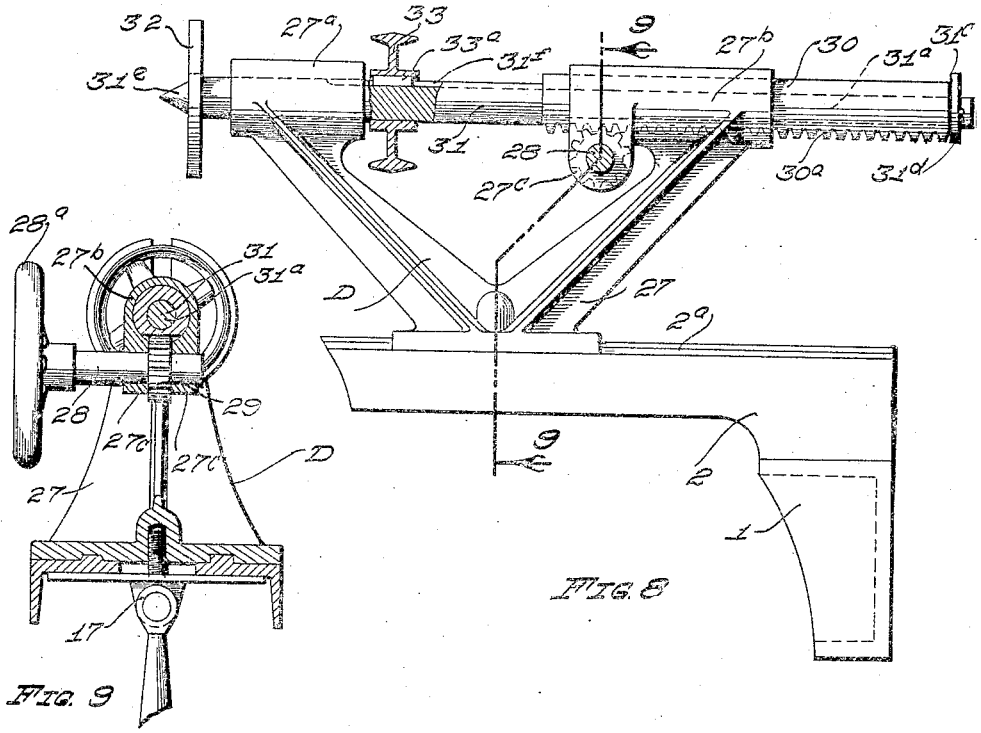
FIG. 8
FIG. 9
INVENTOR.
GEORGE R. BLAUVELT
BY A. B. Bowman
ATTORNEY Patented Feb. 21, 1933

1,898,285

UNITED STATES PATENT OFFICE

GEORGE R. BLAUVELT, OF SAN DIEGO, CALIFORNIA

MACHINE TOOL

Application filed January 18, 1928. Serial No. 247,574.

My invention relates to machine tools and the objects of my invention are: first, to provide a device of this class which is adapted for reaming two or more holes or passages in accurate alinement; second, to provide a device of this class which is especially adapted for reaming the wrist pin bearings in the conventional internal combustion motor piston; third, to provide a device of this class which may be either manual or power driven; fourth, to provide a device of this class which is adapted for light work but which is extremely rugged and sturdy of construction; fifth, to provide a device of this class which is adapted to use the conventional hand reamer or other tool; sixth, to provide a device of this class which supports the cutting tool at both ends thus increasing the accuracy thereof; seventh, to provide a device of this class in which the work is held stationary and the reamer is rotated relative thereto; eighth, to provide a device of this class in which the tail spindle is a longitudinally movable shaft which is extendible through the work and accurately guides the reamer relative thereto; ninth, to provide a device of this class in which the reamer may be automatically or manually fed into the work and in which the automatic feed may be quickly released when desired, tenth, to provide a device of this class in which the work is supported, rigidly secured and accurately adjustable relative to the reamer; eleventh, to provide a device of this class which reduces the time and labor of reaming to a minimum; twelfth, to provide a device of this class which is simple of construction proportional to its functions, sturdy, durable, easily operated and which will not readily deteriorate or get out of order.

Figure 1:
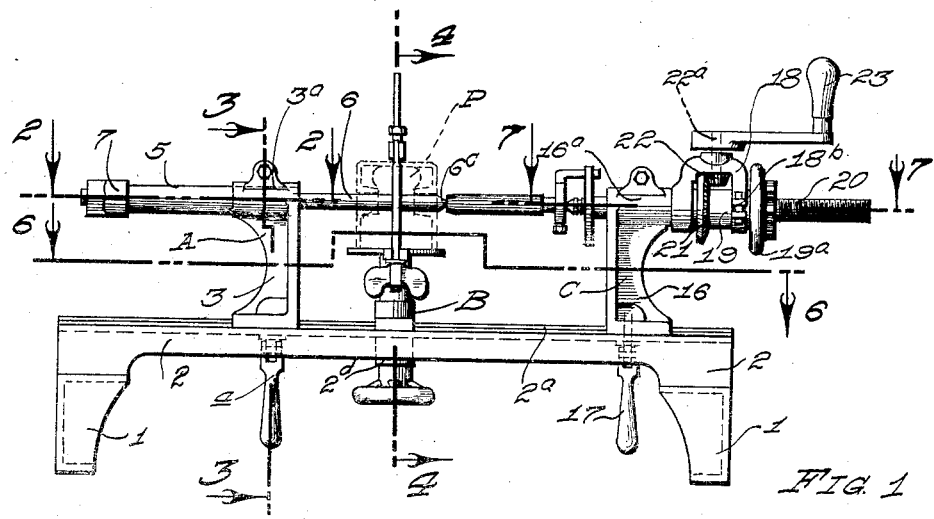
Figure 2:
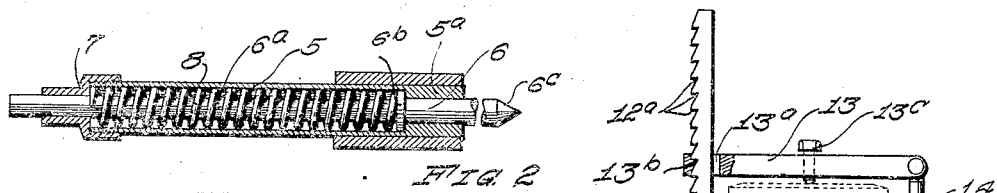
Figure 3:
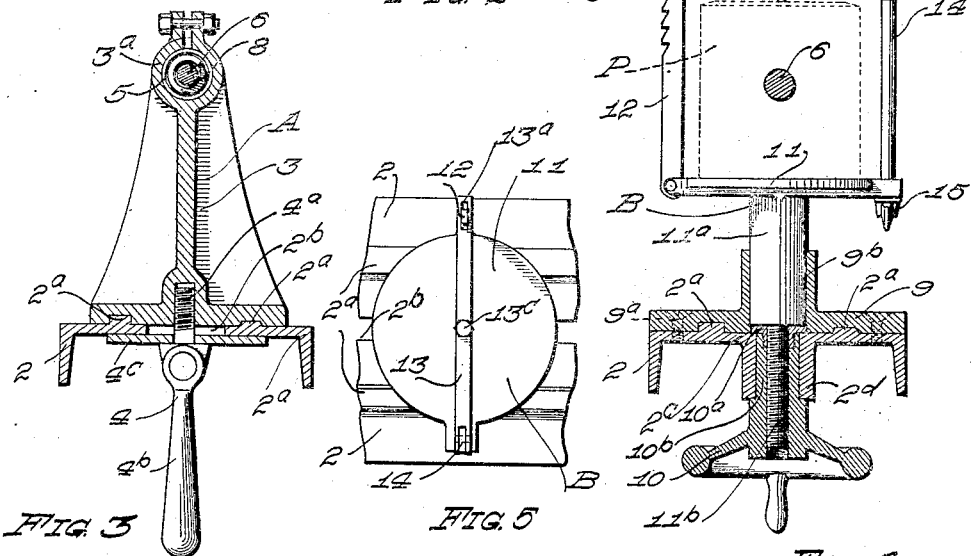
Figure 3:
Figure 5:
Figure 4:

With these and other objects in view as will appear hereinafter, my invention consists of certain novel features of construction, combination and arrangement of parts and portions as will be hereinafter described in detail and particularly set forth in the appended claims reference being had to the accompanying drawings and to the characters of reference thereon which form a part of this application in which:

Fig. 1 is a side elevational view of my machine tool shown in connection with a reaming tool; Fig. 2 is an enlarged longitudinal sectional view of the tailstock assembly through 2—2 of Fig. 1 with parts and portions shown in elevation to facilitate the illustration; Fig. 3 is a transverse sectional view thereof through 3—3 of Fig. 1 with parts and portions shown in elevation to facilitate the illustration; Fig. 4 is a transverse sectional view through 4—4 of Fig. 1 showing the work alining table with parts and portions in elevation to facilitate the illustration; Fig. 5 is a top or plan view of the work alining table with the shear shown fragmentarily; Fig. 6 is a longitudinal sectional view of my machine tool through 6—6 of Fig. 1; Fig. 7 is an enlarged transverse sectional view of the headstock assembly through 7—7 of Fig. 1; Fig. 8 is a side elevational view of an alternative headstock structure with the shear shown fragmentarily; and Fig. 9 is a transverse sectional view thereof through 9—9 of Fig. 8.

Similar characters of reference refer to similar parts and portions throughout the several views of the drawings.

Legs 1, shear 2; tailstock assembly A, which includes a tailstock 3, tailstock clamp 4. tail spindle 5, tail spindle guide 6, tail spindle cap screw 7, tail spindle spring 8; work table assembly B, which includes table support 9, table adjusting wheel 10, table 11, table rack 12, cross member 13, clamping rod 14, thumb nut 15; headstock assembly C, which includes a headstock 16, headstock clamp 17, spindle support 18, feeding sleeve 19, head spindle 20, driven gear 21 driving gear 22, crank 23, plate 24, dog 25, locking means 26; and the modified power driven headstock assembly D, which includes headstock 27, shaft 28, pinion gear 29, tubular rack 30, head spindle 31, plate 32, pulley 33, constitute the principal parts and portions of my machine tool.

The shear 2 is mounted on a pair of legs 1 and is provided with two longitudinally extending guide ridges 2a for permitting accurate longitudinal movement of the headstock and tailstock assemblies A and C. Between the ridges 2a and extending substantially the length of the shear is a slot 2b which is divided near the central portion of the shear by a cross web 2c.

Slidably mounted on the shear 2 with its bottom surface dovetailing with the ridges 2a is a tailstock 3 of the tailstock assembly A. The tailstock 3 is adjustably secured on the shear 2 by means of a clamp 4. The clamp 4 is provided with a screw portion 4a which extends into the under side of the tailstock and which is hinged to a handle 4b. Between the handle 4b and the screw portion 4a is a cross member 4c which engages the under surface of the shear when the screw portion is screwed to the tailstock 3, as shown best in Fig. 3 of the drawings. The upper portion of the tailstock 3 is provided with a split bearing 3a which supports the one end of the tail spindle guide 5. The tail spindle guide 5 is substantially cylindrical in shape with a broad annular internally extending ridge 5a at its supported end which serves as a bushing for the tail spindle 6. The tail spindle 6 is provided with a reduced portion 6a which extends from the bushing 5a, through the unsupported end of the guide 5 and through a cap screw 7 which is secured to the end of the guide 5. Between the cap screw 7 and a collar 6b which terminates the reduced portion 6a is a spring 8 which normally holds the collar 6b against the bushing 5a. The unreduced portion of the tail spindle normally extends a considerable distance from the bushing and forms a dead center 6c at the extremity thereof.

The cross web 2c near the central portion of the shear 2 is provided with an integral hollow downwardly extending boss portion 2d, as shown best in Figs. 1 and 4 of the drawings. Secured across the shear 2 over the cross web 2c by means of screws 9a is a table support 9 which forms a part of the table assembly B. The table support 9 is provided with an upwardly extending hollow sleeve portion 9b which is concentric with and substantially larger than the boss 2d, thus forming a shoulder upon which rests a flanged collar 10a. The flanged collar 10a is secured to a hollow internally threaded shaft 10b of the table adjusting wheel 10. Slidably mounted in the sleeve 9b of the table support 9 is a stem 11a of a substantially circular table 11. A constricted threaded portion 11b of the stem 11 extends into the shaft 10b of the adjusting wheel and engages the threads therein. Thus when the adjusting wheel is revolved the table is raised or lowered. A rack member 12 which is hinged to the rear side of the table 11 normally extends upwardly and is provided with a plurality of projections or teeth 12a along the rear side thereof, as shown best in Fig. 4 of the drawings. A cross member 13 is adjustably mounted at the rack 12 by means of a slot 13a. A projection 13b extends into the slot 13a and engages the teeth of the rack 12, as shown best in Fig. 4 of the drawings. Intermediate the ends of the cross member 13 a bolt 13c is provided which extends downwardly and may be made to press against the upper side of a piston P to be reamed. The extended end of the cross member is hinged to a clamping rod 14 which extends downwardly between a pair of lugs 11c which extend from the front side of the table 11. A wing nut 15 is mounted on the end of the clamping rod, as shown best in Figs. 1 and 4 of the drawings.

A headstock 16 is provided which forms a portion of the headstock assembly C and which is similar in construction to the tailstock 3. The headstock 16 is held in any desired position by means of a headstock clamp 17 similar in construction to the tailstock clamp 4. The upper portion of the headstock terminates in a split bearing 16a in which is adjustably secured the head spindle support 18. The head spindle support 18 is substantially U-shaped with a sleeve portion 18a projecting from the one leg thereof which extends into and is adjustably secured by the split bearing 16a of the headstock clamp. The other leg of the U-shaped head spindle support 18 is formed into a bearing 18b having a removable cap. Revolubly mounted within the bearing 18b is an internally threaded feeding sleeve 19. The one portion of the feeding sleeve extends part way between the two legs of the head spindle support 18. The other extended portion of the feeding sleeve 19 is provided with a wheel 19a. Extending through the sleeve portion 18a and the feeding sleeve 19 is a head spindle 20 which is provided with external threads that engage the internal threads of the feeding sleeve 19. A gear 21 is mounted on the head spindle between the one leg of the head spindle support and the feeding sleeve 19. The gear 21 is secured to the shaft 20 by means of a key 21a which projects into a slot 20a of the shaft 20 thus permitting only longitudinal movement of the spindle relative to the gear 21. A stem 22a extends through the cross portion of the head spindle support 18. A driving gear 22 is mounted on the lower portion of the stem 22a and engages the gear 21. The upper portion of the stem 22a is secured to a crank 23, as shown best in Fig. 1 of the drawings. The extended portion 20b of the shaft 20 is provided with a plate 24. The extremity of the shaft 20 is pointed forming the live center of the reaming machine. The conventional hand reamer R, or any other similar tool, is mounted between the dead center of the tail spindle and the live center of the head spindle, as shown best in Fig. 1 of the drawings. A dog 25 is secured to one end of the reamer R and to the plate 24.

The other extended portion 20c of the head spindle is provided with a hand lock nut 26 which when tightened adjusts the feeding sleeves, locks said sleeve relative to the head spindle.

The operation of my machine is as follows:

The tail spindle 6 is extended through the hole to be reamed in the piston P, or other article. The table is then adjusted until the piston rests upon it and the tail spindle is approximately centered in the hole to be reamed. The cross member 13 is then brought to its lowest possible position on the rack 12 and the clamping rod is brought between the two lugs 11c. The wing nut is screwed on the clamping rod until the cross bar 13 is adjacent to the piston. The bolt 13c is then tightened down upon the top of the piston, thus holding it rigidly on the table 11. The lathe dog 25 is secured to the reamer and the reamer is then mounted between the head spindle and the tail spindle. A projecting portion of the dog 25 interlocks with the plate 24. The reamer is thus held rigid relative to the head spindle similar to the conventional manner of mounting articles on lathes.

When the crank 23 is turned the shaft 20 is actuated by means of the gears 21 and 22. It will not advance however, unless the bearing 18b grips the feeding sleeve 19 with sufficient force to hold it stationary relative to the shaft. Thus when the bearing 18b is tight the shaft 20 is advanced slightly with each revolution. If it is not desired to advance the head spindle automatically the hand nut 26 may be screwed against the feeding sleeve, as shown in Figs. 1 and 7 of the drawings. In such case, the feeding sleeve will turn with the shaft and thus not advance.

It will be noted that other tools may be used in place of the reamer.

In the Figs. 8 and 9 I have shown a modified head structure. In this case machine power is used. The modified structure consists of a headstock 27 which is substantially V-shaped with a broad base, the bottom surface of which is dovetailed with the ridges 2a of the shear 2. The two branches of the headstock 27 terminate in the bearings 27a and 27b. The bearing 27b is provided with a pair of lugs 27c near the one end thereof. A hole extends transversely through the lugs 27c in which is mounted a shaft 28 to which is secured a wheel 28a. Upon the shaft 28 and between the lugs 27c is a pinion 29. A tubular rack member 30 having teeth 30a on the one side thereof which mesh with the pinion gear 29 is mounted within the bearing 27b. A reduced portion 31a of a head spindle 31 extends through the tubular rack 30 and is held against longitudinal movement therewith by means of a collar 31c and a pin 31d. The unreduced portion of the head spindle 31 extends through the bushing 27a and terminates in the live center 31e of the machine tool. A plate 32 is secured near the end of the head spindle 31. A single pulley 33 or a pulley cone if desired is mounted on the head spindle 31 between the bearing 27a and 27b. A key 33a is secured in the pulley 33 and extends into a longitudinal slot 31f in the head spindle thus permitting only longitudinal movement of the head spindle relative to the pulley 33.

The operation of the alternative structure is similar to the first described structure in that the piston or other work to be reamed is mounted as before described. Suitable power is applied to the pulley 33 which rotates the head spindle 31, the wheel 28a is then manually turned causing the reamer to enter the piston as slow or as fast as desirable.

Though I have shown and described a particular construction, combination and arrangement of parts and portions and a certain modification I do not wish to be limited to this particular construction, combination and arrangement nor to the modified structure but desire to include in the scope of my invention the construction, combination and arrangement substantially as set forth in the appended claims.

Having thus described my invention what I claim as new and desire to secure by Letters Patent is:

1. In a machine tool of the class described, a shear, a vertically disposed sleeve and journal means shiftable longitudinally intermediate the ends of said shear, a stem shiftable vertically in said sleeve and journal means, a table positioned upon the upper end of said stem, a hand wheel including a hub portion rotatably mounted in said sleeve and journal means, a threaded reduced extension on said stem projecting through said hub whereby rotation of said hand wheel raises and lowers said table, a ratchet clamp associated with said table adapted to clamp a piston on said table, and means in connection with said clamp means for centering the piston on said table.

2. In a machine tool of the class described, a shear member, a vertically disposed sleeve and journal means shiftable longitudinally intermediate the ends of said shear, a two-diameter stem shiftable vertically in said sleeve and journal means, a hand wheel provided with a reduced hub portion rotatably mounted in said sleeve and journal means and provided with internal threads adapted to engage the reduced portion of said stem, a horizontally disposed table positioned on the upper end of said stem, a piston clamping means pivotally connected with said table, and ratchet means in connection therewith for quickly connecting said clamping means with said table.

3. In a machine tool of the class described, a shear member, a vertically disposed sleeve and journal means shiftable longitudinally intermediate the ends of said shear, a two-diameter stem shiftable vertically in said sleeve and journal means, a hand wheel provided with a reduced hub portion rotatably mounted in said sleeve and journal means and provided with internal threads adapted to engage the reduced portion of said stem, a horizontally disposed table positioned on the upper end of said stem, a piston clamping means pivotally connected with said table, and ratchet means in connection therewith for quickly connecting said clamping means with said table, said clamping means consisting of a bar connected to said table at one side, a ratchet member pivotally connected to said table at the opposite side, a horizontally disposed bar pivotally connected to said first mentioned bar and provided with ratchet teeth engageable with said ratchet bar, and a centering means mounted on said horizontally disposed bar.

In testimony whereof, I have hereunto set my hand at San Diego, California, this 31st day of December 1927.

GEORGE R. BLAUVELT.